(12) United States Patent
Kim (10) Patent No.: US 9,939,039 B2
(45) Date of Patent: Apr. 10, 2018

(54) ENGINE MOUNT (71) Applicant: Hyundai Motor Company, Seoul (KR)

(72) Inventor: Seung-Won Kim, Seoul (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 15/078,316

(22) Filed: Mar. 23, 2016

(65) Prior Publication Data

US 2017/0122399 A1 May 4, 2017

(30) Foreign Application Priority Data

Nov. 2, 2015 (KR) .................. 10-2015-0152898

(51) Int. Cl.
*F16F 5/00* (2006.01)
*F16F 13/10* (2006.01)
*B60K 5/12* (2006.01)

(52) U.S. Cl.
CPC .......... *F16F 13/107* (2013.01); *B60K 5/1208* (2013.01); *F16F 13/10* (2013.01)

(58) Field of Classification Search
CPC ...... F16F 13/007; F16F 13/107; F16F 13/105; F16F 13/1463; F16F 13/18; F16F 9/348; F16F 13/1472; F16F 1/377; F16F 9/34; F16F 13/06; B60K 5/1208; B60K 5/12
USPC .................................................. 267/140.13
See application file for complete search history.

(56) References Cited

U.S. PATENT DOCUMENTS

| | | | | | |
|---|---|---|---|---|---|
| 4,877,225 | A | * | 10/1989 | Noguchi ............... | F16F 13/262 267/140.14 |
| 5,246,211 | A | * | 9/1993 | Klein .................... | F16F 13/105 267/140.13 |
| 5,344,127 | A | * | 9/1994 | Hettler .................. | F16F 13/26 267/140.13 |
| 5,433,421 | A | * | 7/1995 | Ishiyama .............. | F16F 13/107 248/559 |
| 5,462,261 | A | * | 10/1995 | Eckel .................... | F16F 13/262 267/140.13 |

(Continued)

FOREIGN PATENT DOCUMENTS

| | | |
|---|---|---|
| JP | H10-38017 A | 2/1998 |
| JP | 10-227328 A | 8/1998 |

(Continued)

*Primary Examiner* — Anna M Momper
*Assistant Examiner* — Mahbubur Rashid
(74) *Attorney, Agent, or Firm* — Mintz Levin Cohn Ferris Glovsky and Popeo, P.C.; Peter F. Corless (57) ABSTRACT

An engine mount is provided in which a nozzle plate is mounted between an insulator and a diaphragm to divide an inner space into an upper liquid chamber and a lower liquid chamber. A hydraulic liquid flows between the upper and lower liquid chambers through a first flow path formed on the nozzle plate based on a change in volume in the engine mount. The nozzle plate which includes a second flow path having an outlet disposed at an upper end of the second flow path and in communication with the upper liquid chamber. A diaphragm is coupled to a lower portion of the nozzle plate to form the lower liquid chamber, and divides the lower liquid chamber into a main liquid chamber and an auxiliary liquid chamber. Additionally, a valve plate is seated at an upper side of the upper end of the second flow path.

3 Claims, 5 Drawing Sheets

(56) References Cited

U.S. PATENT DOCUMENTS

| | | | | |
|---|---|---|---|---|
| 5,601,280 A * | 2/1997 | Nagaya | F16F 13/26 267/140.14 |
| 6,439,554 B1 * | 8/2002 | Takashima | F16F 13/26 267/140.13 |
| 6,523,816 B1 * | 2/2003 | Gastineau | F16F 13/264 267/140.14 |
| 7,275,739 B2 * | 10/2007 | Winkler | F16F 13/26 267/140.14 |
| 7,448,605 B2 * | 11/2008 | Bretaudeau | F16F 13/268 267/140.14 |
| 8,616,537 B2 * | 12/2013 | Marienfeld | F16F 13/262 267/140.14 |
| 2004/0086134 A1 * | 5/2004 | Matsuoka | F16F 13/26 381/71.4 |
| 2004/0145125 A1 * | 7/2004 | Satori | F16F 13/105 277/628 |
| 2005/0236750 A1 * | 10/2005 | Freudenberg | F16F 13/262 267/140.11 |
| 2006/0082036 A1 * | 4/2006 | Miyahara | F16F 7/12 267/140.13 |
| 2012/0242019 A1 * | 9/2012 | Koyama | F16F 13/268 267/140.14 |
| 2012/0242020 A1 * | 9/2012 | Muraoka | F16F 13/26 267/140.14 |
| 2014/0014450 A1 * | 1/2014 | West | F16F 9/10 188/298 |
| 2014/0175719 A1 * | 6/2014 | Kanaya | F16F 13/106 267/140.13 |

FOREIGN PATENT DOCUMENTS

| | | |
|---|---|---|
| JP | 2001-041279 A | 2/2001 |
| JP | 3528030 B2 | 5/2004 |
| JP | 2006-207673 A | 8/2006 |
| JP | 06-011393 B2 | 10/2016 |
| KR | 10-0478778 B1 | 3/2005 |
| KR | 10-2014-0069838 | 6/2014 |

* cited by examiner

FIG. 1

RELATED ART

ENGINE MOUNT

CROSS-REFERENCE TO RELATED APPLICATIONS

This application claims priority under 35 U.S.C. § 119 to Korean Patent Application No. 10-2015-0152898, filed on Nov. 2, 2015, in the Korean Intellectual Property Office, the disclosure of which is incorporated herein by reference in its entirety.

BACKGROUND

1. Field of the Invention

The present invention relates to an engine mount which is mounted to attenuate vibration generated by an engine and support a load of the engine, and more particularly, to an engine mount which has self-conversion characteristics to more effectively attenuate vibration without a separate drive unit by changing attenuation characteristics based on a traveling condition.

2. Description of the Related Art

A vehicle engine is typically installed in an engine room of the vehicle body using an engine mount to attenuate vibration in the engine. For the mount applied to a passenger vehicle, a rubber mount which insulates and attenuates vibration using elastic force of rubber, and a fluid filled type mount (e.g., hydraulic mount) in which a predetermined amount of a hydraulic liquid is encapsulated are generally used.

In particular, the fluid filled type mount has a structure in which a predetermined amount of hydraulic liquid is encapsulated therein and vibration is attenuated by a flow of the hydraulic liquid, and has an effect of simultaneously attenuating vibration in a high frequency region and a low frequency region, to gradually increase a range of application of the fluid filled type mount. However, when the amount of encapsulated hydraulic liquid is increased when the fluid filled type mount is manufactured, a loss factor (e.g., damping) is increased, and dynamic characteristics are increased causing the noise, vibration, harshness (NVH) performance to deteriorate. Additionally, when the amount of encapsulated hydraulic liquid is decreased, the dynamic characteristics are decreased thus improving the NVH performance, but the loss factor is decreased. Therefore, to more efficiently attenuate vibration at a particular frequency region in the fluid filled type mount, an active mount, which may actively control damping characteristics, has been developed.

Figure 1:
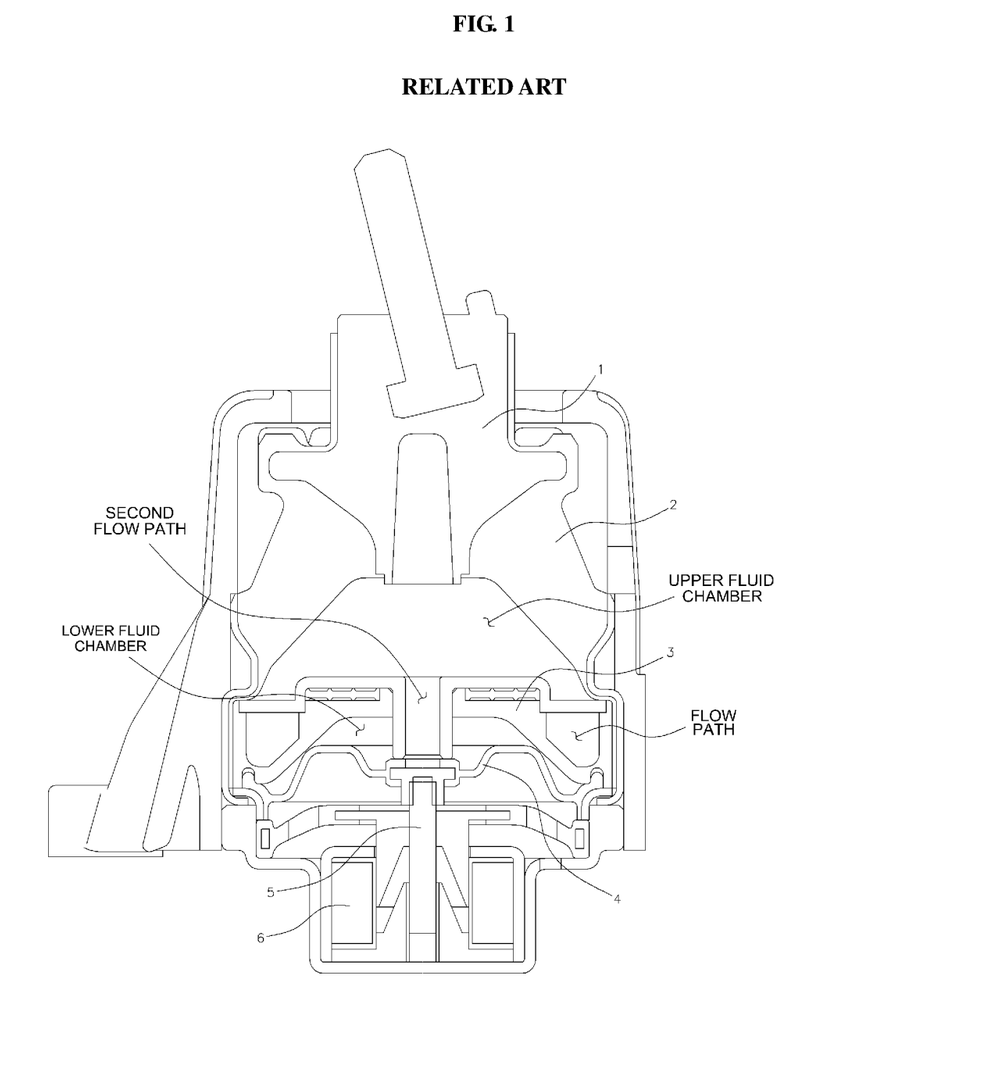
FIG. 1 is a view illustrating an active mount in the related art is cut out in a longitudinal direction.

The active mount is configured to control dynamic characteristics of the mount in an on/off manner. As illustrated in FIG. 1, an active mount in the related art has a structure in which an insulator 2, which is made of an elastic material and coupled to a core 1, is mounted at an upper side within a case, a diaphragm 4 is coupled at a lower end of the case, and a nozzle plate 3 is mounted between the insulator 2 and the diaphragm 4, dividing an internal space into an upper liquid chamber and a lower liquid chamber.

The nozzle plate 3 includes an annular flow path formed therein along a circumference of the nozzle plate to allow the encapsulated hydraulic liquid to flow between the upper liquid chamber and the lower liquid chamber. The flow of the hydraulic liquid occurs as a volume in the upper liquid chamber is increased and decreased when the insulator 1 coupled to the core 1 is elastically deformed by load movement and vibration transmitted from the engine.

Further, a second flow path, which allows the upper liquid chamber and the lower liquid chamber to be additionally in communication with each other in a vertical direction, is disposed at a center of the nozzle plate 3, and a rod 5, which has an upper end connected with the diaphragm 4 and moves vertically, is disposed at a lower side of the second flow path. The rod 5 is coupled to a spring (not illustrated) to provide elastic force in a direction in which the rod 5 shields the second flow path (in a direction in which the rod 5 moves upward), and the coil 6 is disposed to be adjacent to the rod 5. Further, when electric power is applied to the coil 6, the rod 5 is moved downward by electromagnetic force, and the second flow path allows the upper liquid chamber and the lower liquid chamber to be additionally in communication with each other.

However, since the active mount has a structure in which a drive unit (including the rod, the spring, the coil, a power supply unit, and the like) is additionally mounted on the fluid filled type mount, there are problems in that since the drive unit is additionally mounted, production costs and weight are increased, and electrical power consumption is also increased, thereby having an adverse effect on fuel efficiency.

SUMMARY

The present invention provides a fluid filled type engine mount capable of further improving damping performance and NVH performance while being self-converted without additionally requiring a drive unit, by autonomously changing flow characteristics of a hydraulic liquid based on vibration characteristics input based on various traveling conditions.

An exemplary embodiment of the present invention provides an engine mount in which a nozzle plate may be mounted between an insulator and a diaphragm to divide an inner space into an upper liquid chamber and a lower liquid chamber, and an encapsulated hydraulic liquid may flow between the upper liquid chamber and the lower liquid chamber through a flow path formed on the nozzle plate based on a change in volume in the engine mount, the engine mount may include: the nozzle plate having a second flow path with an outlet that is disposed at an upper end of the second flow path and in communication with the upper liquid chamber; a diaphragm coupled to a lower portion of the nozzle plate to form the lower liquid chamber, and mounted to divide the lower liquid chamber into a main liquid chamber and an auxiliary liquid chamber; and a valve plate seated at an upper side of the upper end of the second flow path, in which the main liquid chamber is in communication with the upper liquid chamber through the flow path, the auxiliary liquid chamber is in communication with the upper liquid chamber through the second flow path, and the hydraulic liquid may flow between the upper liquid chamber and the auxiliary liquid chamber through the second flow path when the valve plate moves upward by negative pressure applied into the upper liquid chamber.

Further, a fine channel, which allows the second flow path and the upper liquid chamber to be in communication with each other to allow the hydraulic liquid to minutely flow even though the valve plate is closed, may be formed in the second flow path. An inclined aperture, which has an inner diameter that increases toward an upper side of the inclined aperture, may be formed at the upper end of the second flow path, and an inclined protrusion, which has an inner diameter that decreases toward a lower end of the inclined protrusion, may be formed on the valve plate to be fitted into the inclined aperture. The valve plate may have a circular plate shape, a plurality of flow path apertures may be formed around a central portion where the inclined protrusion is formed, and the valve plate may be mounted to be seated in a rib that protrudes in a circular shape from an upper surface of the nozzle plate.

In the exemplary embodiment of the present invention, the fine channel may be formed in a surface of the inclined aperture. Further, a lower case may be mounted at a lower side of the diaphragm, and a cup-shaped close contact portion, which is formed on an upper surface of the lower case, may press the diaphragm on a lower surface of the nozzle plate, to divide the lower liquid chamber is divided into the main liquid chamber and the auxiliary liquid chamber.

The active mount in the related art is advantageous in terms of performance since damping characteristics may be changed for each traveling condition, but has problems in that manufacturing costs and a weight are increased, and arrangement of wiring connected with a drive unit is complex, and as a result, there is a limitation to a type of vehicle mounted with the active mount. However, the engine mount according to an exemplary embodiment of the present invention may be manufactured while incurring the same costs as the fluid filled type engine mount in the related art, does not increase a weight thereof, and does not require wiring since the drive unit is omitted, thereby further applying the engine mount to various types of vehicles.

Furthermore, damping characteristics of the engine mount according to the present invention may be autonomously changed based on intensity of input vibration, for example, damping characteristics of an active mount, and as a result, vibration attenuation performance may be better than that of a fluid filled type engine mount in the related art (which does not have a drive unit), and dynamic characteristics may be decreased (e.g., NVH performance may be improved).

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described in detail with reference to the accompanying drawings so that those skilled in the technical field to which the present invention pertains may more easily carry out the present invention. However, the present invention may be implemented in various different ways, and is not limited to the exemplary embodiment described herein.

A part irrelevant to the description will be omitted to clearly describe the present invention, and the same or similar constituent elements will be designated by the same reference numerals throughout the specification. In addition, terms or words used in the specification and the claims should not be interpreted as being limited to a general and dictionary meaning and should be interpreted as a meaning and a concept which conform to the technical spirit of the present invention based on a principle that an inventor can appropriately define a concept of a term to describe his/her own invention by the best method.

Figure 2:
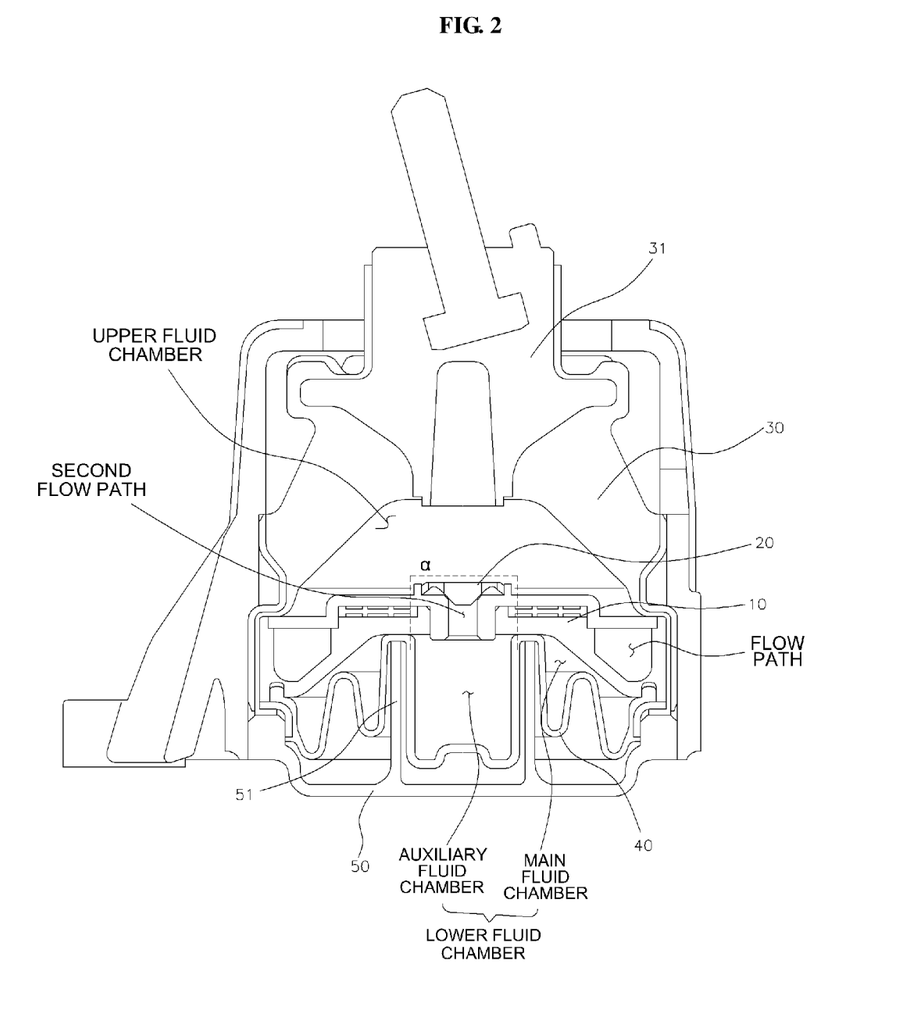
FIG. 2 is a view illustrating an engine mount according to an exemplary embodiment of the present invention is cut out in a longitudinal direction.

Referring to FIG. 2, similar to the fluid filled type engine mount of the related art as shown in FIG. 1, an engine mount according to an exemplary embodiment of the present invention may have a structure in which an insulator 30, made of an elastic material and coupled to a core 31, may be mounted at an upper side within a case, a diaphragm 40 may be coupled at a lower end of the case, and a nozzle plate 10 may be mounted between the insulator 30 and the diaphragm 40, to divide an internal space thereof into an upper liquid chamber and a lower liquid chamber. Further, the nozzle plate 10 may include an annular flow path formed therein along a circumference of the nozzle plate to allow an encapsulated hydraulic liquid to flow between the upper liquid chamber and the lower liquid chamber. Further, when a volume in the upper liquid chamber is changed as the insulator 30 is elastically deformed by load movement and vibration transmitted from an engine, the hydraulic liquid may flow.

Further, the nozzle plate 10 may include a second flow path having an outlet (e.g., a first outlet) disposed at an upper end of the second flow path and in communication with the upper liquid chamber, and an outlet (e.g., a second outlet) disposed at a lower end of the second flow path and in communication with an auxiliary liquid chamber, and the diaphragm 40 may divide the lower liquid chamber into a main liquid chamber and an auxiliary liquid chamber. In other words, a lower case 50 may be mounted at a lower side of the diaphragm 40, and a cup-shaped close contact portion 51, formed on an upper surface of the lower case 50, may be configured to press the diaphragm 40 on a lower surface of the nozzle plate 10, to divide the lower liquid chamber into the main liquid chamber and the auxiliary liquid chamber.

The main liquid chamber may be in communication with the upper liquid chamber via the flow path (e.g., first flow path), and the auxiliary liquid chamber may be in communication with the upper liquid chamber via the second flow path.

Additionally, a valve plate 20 may be seated at an upper side of the upper end of the second flow path. In other words, the valve plate 20 may be seated at the upper side of the second flow path and may be configured to block the hydraulic liquid from flowing through the second flow path, and move upward when negative pressure is applied into the upper liquid chamber due to elastic deformation of the insulator 30. Therefore, when the valve plate 20 moves downward, the hydraulic liquid may flow into the main liquid chamber through the flow path, and when the valve plate 20 moves upward, the hydraulic liquid may also flow into the auxiliary liquid chamber through the second flow path.

Figure 3A:
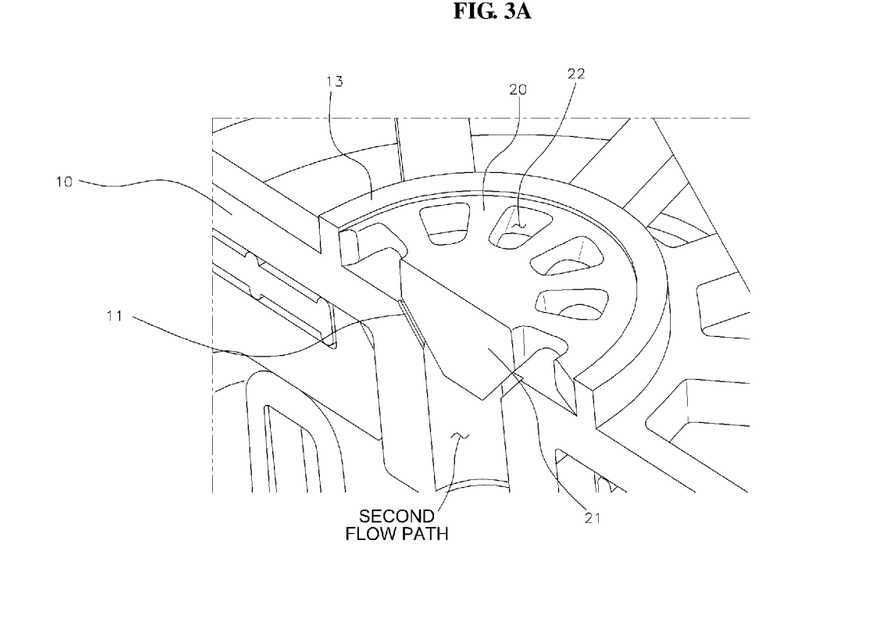
FIGS. 3A-3B are views illustrating part 'α' in FIG. 2, and a valve plate detached from the view of FIG. 3A.
Figure 3B:
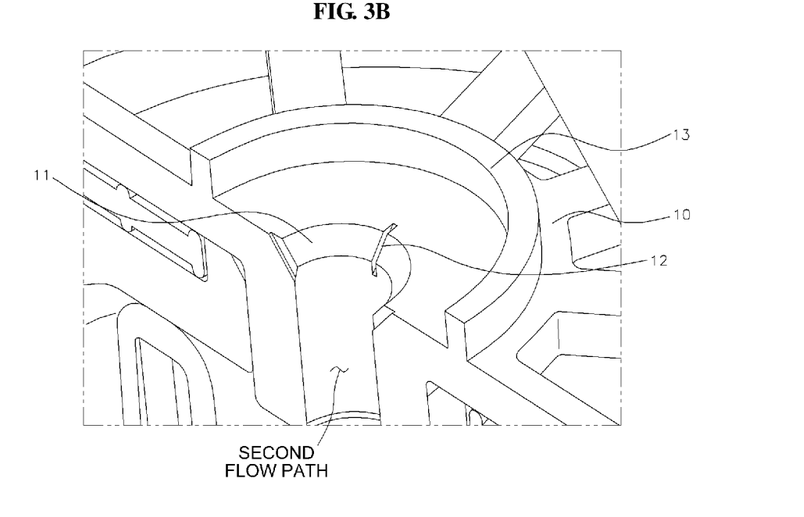

However, a fine channel (e.g., a narrow channel), which allows the second flow path and the upper liquid chamber to be in communication with each other, may be additionally formed in the second flow path to allow the hydraulic liquid to minutely (e.g., minimally) flow even though the valve plate 20 is closed. In particular, as illustrated in FIGS. 3A and 3B, an inclined aperture 11, having an inner diameter that increases toward an upper side of the inclined aperture 11, may be formed at the upper end of the second flow path, an inclined protrusion 21, having an inner diameter that decreases toward a lower end of the inclined protrusion 21, may be formed on the valve plate 20 to be fitted into the inclined aperture 11, and a plurality of fine channels 12 (e.g., narrow channels), which is not shielded by the inclined protrusion 21, may be formed.

In the exemplary embodiment of the present invention, the valve plate 20 may have a circular plate shape, and a plurality of flow path apertures 22 may be formed around a central portion where the inclined protrusion 21 is formed to allow a flow of the hydraulic liquid even though the valve plate does not move upward away from a rib. Further, the valve plate 20 may be mounted to be seated in a rib 13, which protrudes in a circular shape from the upper surface of the nozzle plate 10, and thus the valve plate 20 may be guided without deviating from an original position (e.g., the valve plate's own position) when the valve plate 20 moves upward.

The present invention, which has the aforementioned configurations, may increase a loss factor and decrease dynamic characteristics by closing the second flow path when the engine idles and thus vibration with low amplitude is generated, and by opening the second flow path when the vehicle travels and thus vibration with high amplitude is generated.

Figure 4:
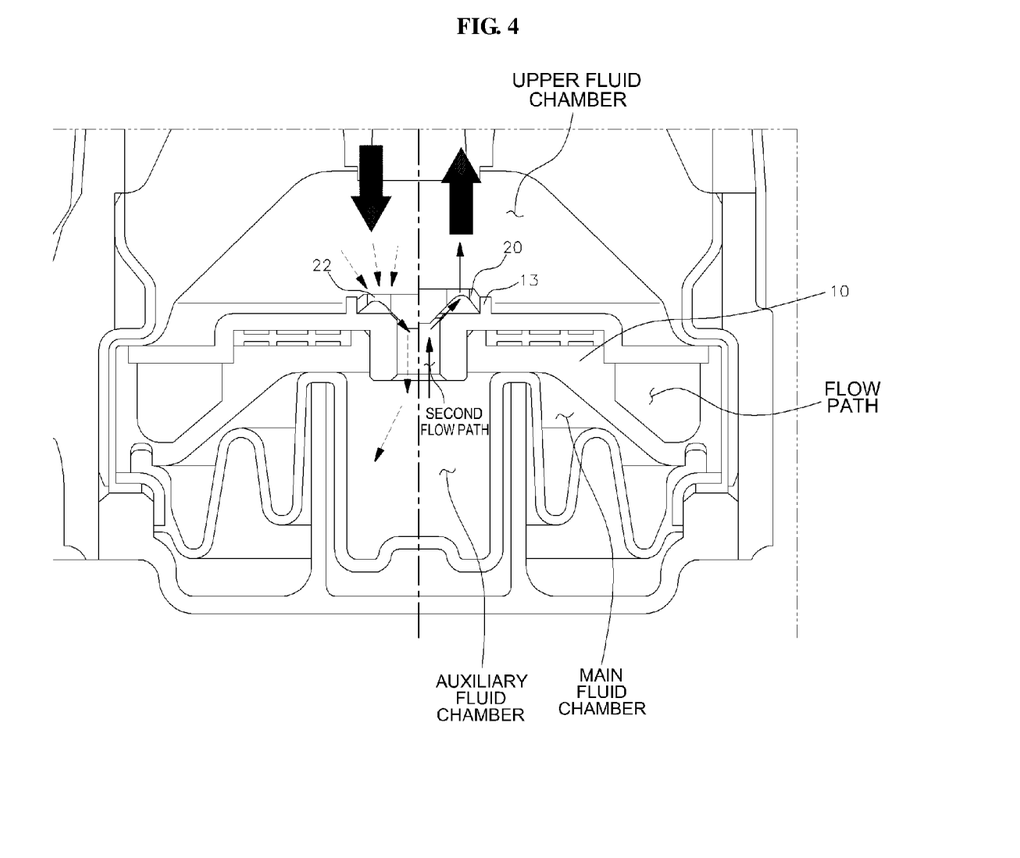
FIG. 4 is a view illustrating the valve plate operated when vibration with relatively greater amplitude is generated (when a vehicle travels)

In other words, when the vehicle travels and thus vibration with high amplitude is generated in a vertical direction, the insulator 30 may be elastically deformed as illustrated in FIG. 4 (e.g., when the core moves downward and then moves upward), and as a result, negative pressure may occur in the upper liquid chamber. Therefore, the valve plate 20 may be moved upward by the negative pressure, and the hydraulic liquid may flow through the upper liquid chamber and the auxiliary liquid chamber. Particularly, a flow rate of the hydraulic liquid drawn into the upper liquid chamber from the auxiliary liquid chamber by the negative pressure may be greater than a flow rate of the hydraulic liquid flowing into the auxiliary liquid chamber from the upper liquid chamber. Therefore, the amount of encapsulated hydraulic liquid may be increased, thereby improving damping performance.

Therefore, the flow rate of the hydraulic liquid may be more greatly increased than a flow rate in a state in which the valve plate is closed, and as a result, the loss factor may be increased and damping performance may be improved. In particular, the hydraulic liquid may always pass through the fine channel 12, but when the insulator is substantially displaced as described above, a flow rate of the hydraulic liquid, which moves upward from the auxiliary liquid chamber to the upper liquid chamber, may be substantially greater than a flow rate of the hydraulic liquid which returns to the auxiliary liquid chamber through the fine channel.

Figure 5:
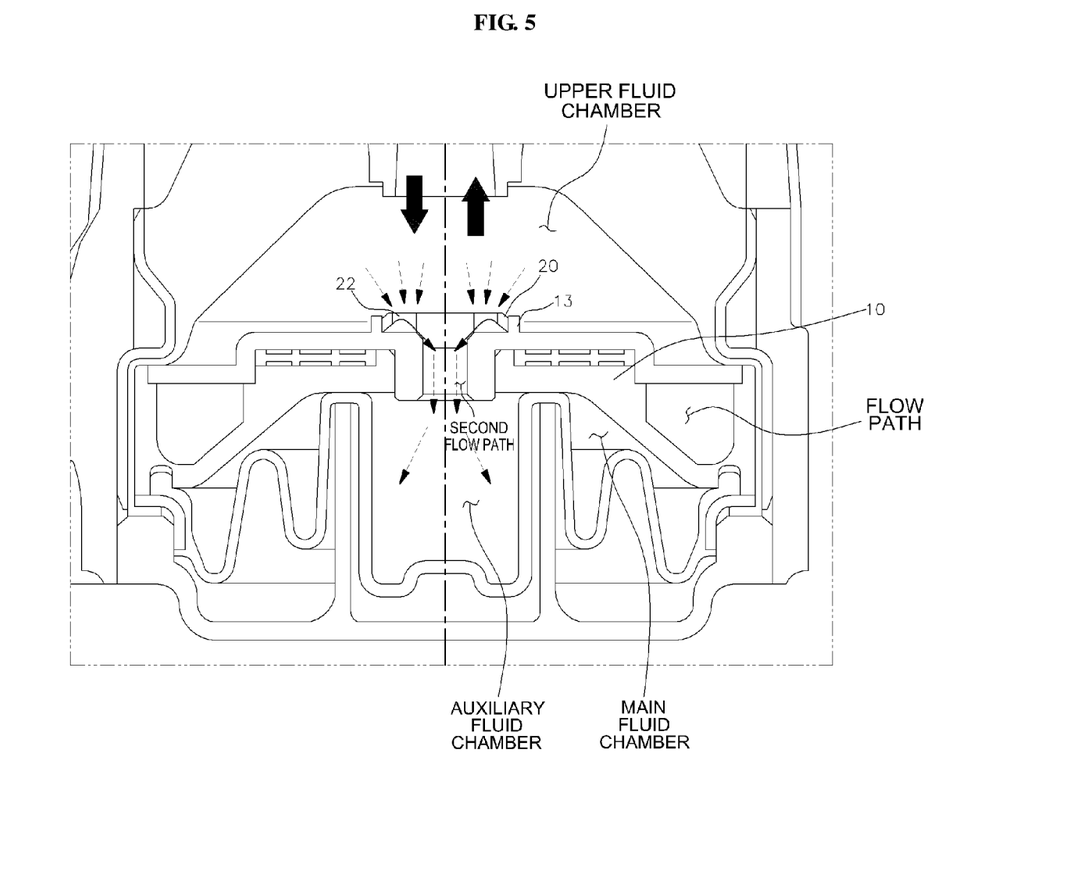
FIG. 5 is a view illustrating the valve plate operated when vibration with relatively less amplitude is generated (when an engine idles).

Further, when the engine idles and thus vibration with relatively lower amplitude is generated, the insulator 30 may be less elastically deformed as illustrated in FIG. 5, and thus, the generated negative pressure may be insufficient to move the valve plate 20 upward in the upper liquid chamber. Therefore, a part of the hydraulic liquid in the upper liquid chamber may return to the auxiliary liquid chamber through the fine channel 12. In particular, the hydraulic liquid, which may return through the fine channel 12, may flow due to gravity and/or a pressure difference between the upper liquid chamber and the auxiliary liquid chamber as the insulator is elastically deformed, pressure in the upper liquid chamber may become greater than pressure in the auxiliary liquid chamber. In addition, since the amount of encapsulated hydraulic liquid may be decreased as much as the amount of hydraulic liquid which returns to the auxiliary liquid chamber, dynamic characteristics may be decreased and NVH performance may be improved.

According to the exemplary embodiment of the present invention which has the aforementioned configurations, the auxiliary liquid chamber, in communication with the upper liquid chamber via the second flow path, may be additionally provided in consideration of the fact that characteristics of vibration input to the engine mount vary based on when the engine idles and when the vehicle travels, and the valve plate 20 may be adjusted by amplitude of the input vibration to open and close the second flow path, and as a result, it may be possible to increase the loss factor and increase damping performance by opening the valve plate 20 when the vehicle travels to allow the hydraulic liquid to be drawn upward from the auxiliary liquid chamber to the upper liquid chamber, and it may be possible to decrease dynamic characteristics and improve NVH performance by closing the valve plate 20 when the engine idles to return the hydraulic liquid to the auxiliary liquid chamber from the upper liquid chamber which has higher pressure than the auxiliary liquid chamber.

The present invention, which has been described above, is not limited by the aforementioned exemplary embodiment and the accompanying drawings, and it is obvious to those skilled in the art to which the present invention pertains that various substitutions, modifications and alterations may be made without departing from the technical spirit of the present invention.

What is claimed is:

1. An engine mount in which a nozzle plate is mounted to divide an inner space into an upper liquid chamber and a lower liquid chamber, and an encapsulated hydraulic liquid flows between the upper liquid chamber and the lower liquid chamber through a first flow path formed on the nozzle plate based on a change in volume in the engine mount, the engine mount comprising:
    a second flow path formed in the nozzle plate and having an outlet disposed at an upper end of the second flow path and in communication with the upper liquid chamber;

a diaphragm coupled to a lower portion of the nozzle plate to form the lower liquid chamber, and mounted to divide the lower liquid chamber into a main liquid chamber and an auxiliary liquid chamber; and a valve plate seated at an upper side of the upper end of the second flow path, wherein the main liquid chamber is in communication with the upper liquid chamber via the first flow path, the auxiliary liquid chamber is in communication with the upper liquid chamber via the second flow path, and the hydraulic liquid flows between the upper liquid chamber and the auxiliary liquid chamber through the second flow path when the valve plate moves upward by negative pressure applied into the upper liquid chamber, a narrow channel, which allows the second flow path and the upper liquid chamber to be in communication with each other to allow the hydraulic liquid to minutely flow even though the valve plate is closed, is formed in the second flow path, the narrow channel being formed over an entire length of an inclined aperture that is arranged at the upper end of the second flow path, and a lower case is mounted at a lower side of the diaphragm, and a cup-shaped close contact portion, formed on an upper surface of the lower case, is configured to press the diaphragm on a lower surface of the nozzle plate, to divide the lower liquid chamber into the main liquid chamber and the auxiliary liquid chamber, wherein the valve plate is mounted to be seated in a rib that protrudes in a circular shape from an upper surface of the nozzle plate.

2. The engine mount of claim 1, wherein the inclined aperture, which has an inner diameter that increases toward an upper side of the inclined aperture, is formed at the upper end of the second flow path, and an inclined protrusion, which has an inner diameter that decreases toward a lower end of the inclined protrusion, is formed on the valve plate to be fitted into the inclined aperture.

3. The engine mount of claim 2, wherein the valve plate has a circular plate shape, and a plurality of flow path apertures are formed around a central portion where the inclined protrusion is formed.

* * * * *